Figure 1A:
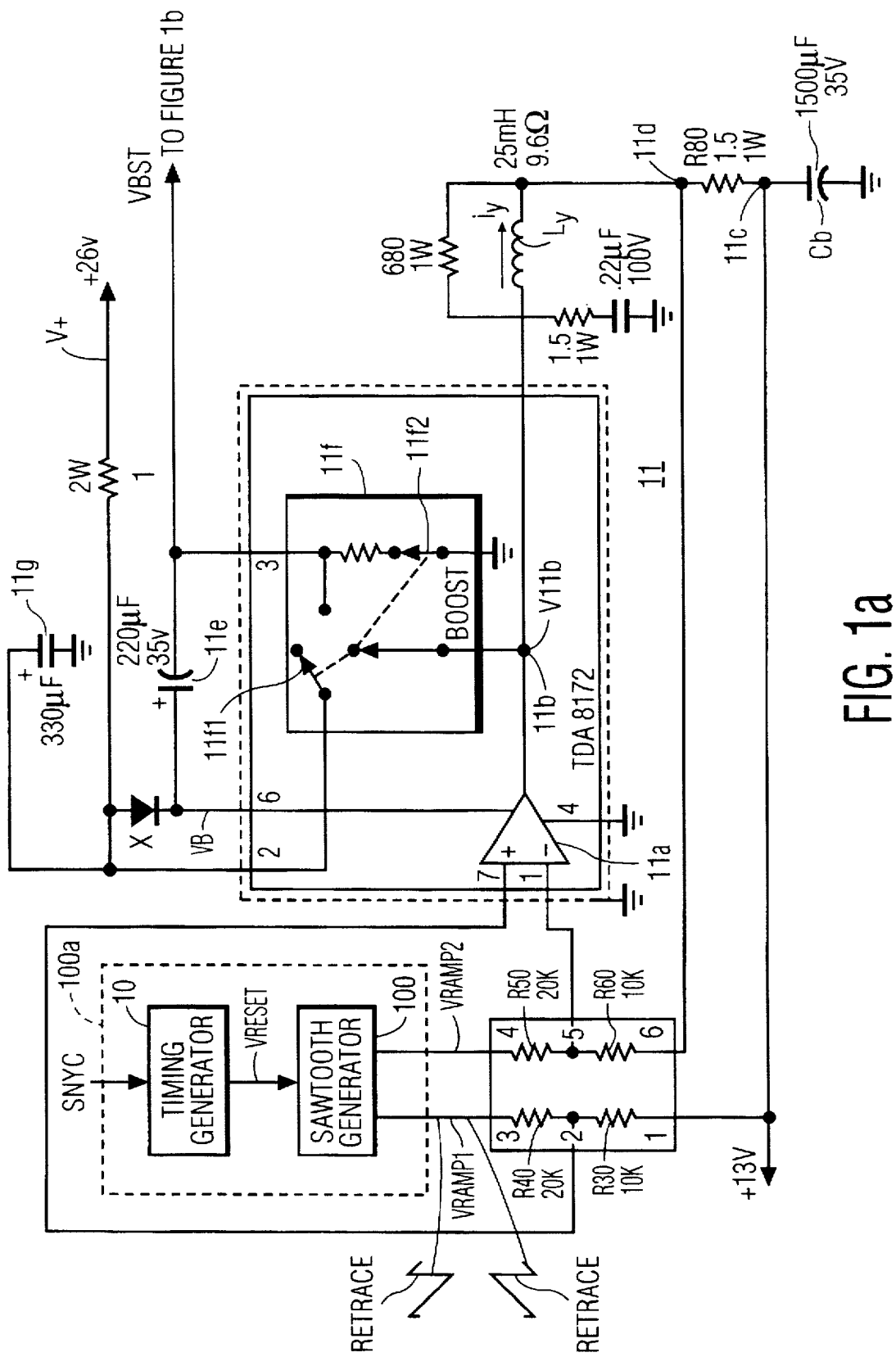

United States Patent [19]
Wilber

[11] Patent Number: 5,777,685
[45] Date of Patent: Jul. 7, 1998

[54] DEFLECTION SIGNAL PULSE SHAPER CIRCUIT

[75] Inventor: James Albert Wilber, Indianapolis, Ind.

[73] Assignee: Thomson Consumer Electronics, Inc., Indianapolis, Ind.

[21] Appl. No.: 675,199

[22] Filed: Jul. 3, 1996

[51] Int. Cl.$^6$ .................. H04N 5/04; G09G 1/04
[52] U.S. Cl. .......... 348/500; 348/565; 348/512; 348/634; 348/637; 315/364; 315/384
[58] Field of Search ............... 348/510, 564, 348/565, 545, 547, 548, 501, 512, 516, 521, 546, 634, 635, 637, 500; 315/384, 386, 387, 399, 403, 364; H04N 3/24, 5/445, 5/04; G09G 1/04

[56] References Cited

U.S. PATENT DOCUMENTS

| | | | |
|---|---|---|---|
| 4,737,691 | 4/1988 | Den Hollander et al. | 315/371 |
| 5,025,496 | 6/1991 | Canfield | 358/153 |
| 5,229,692 | 7/1993 | Wilber | 315/371 |
| 5,420,641 | 5/1995 | Tsuchida | 348/556 |
| 5,465,032 | 11/1995 | Elgert et al. | 315/403 |
| 5,502,501 | 3/1996 | Rumreich et al. | 348/526 |
| 5,596,250 | 1/1997 | Truskalo | 315/371 |
| 5,703,445 | 12/1997 | Wilber | 315/387 |

OTHER PUBLICATIONS

CTC168/169 Technical Training Manual, First Edition 9022—First Printing, dated 1990 by Thomson Consumer Electronics, Inc., pp. 86 and 87 being enclosed.

Service Manual for color monitor 5LA(CMJ5387L) published by Samsung Electronics, Co. Ltd., Korea, dated Jan. 1996, the two sides of cover sheet and p. 11 entitled Main Schematic Diagram being enclosed.

*Primary Examiner*—Mark R. Powell
*Assistant Examiner*—Ronald D. House
*Attorney, Agent, or Firm*—Joseph S. Tripoli; Joseph J. Laks; Sammy S. Henig

[57] ABSTRACT

An arrangement for reproducing a composite blanking or sync signal includes a vertical deflection circuit having a supply boost stage. A first pulse voltage at a vertical rate is derived from an output signal of the boost stage. The vertical rate, first pulse voltage is coupled to a base terminal of an emitter follower via a voltage divider for producing a leading edge of an output pulse voltage of the emitter follower. The vertical rate first pulse voltage is also coupled via an R-C network to a regenerative switch. The regenerative switch is coupled to the base terminal of the emitter follower for producing a trailing edge of the output pulse voltage of the emitter follower. The trailing edge is produced after a predetermined interval has elapsed from the leading edge. The output pulse voltage of the emitter follower is combined with a horizontal rate pulse voltage for producing the composite sync signal. The composite sync signal is coupled to a field detector of a picture-in-picture processor of a video display.

16 Claims, 2 Drawing Sheets

DEFLECTION SIGNAL PULSE SHAPER CIRCUIT

The invention relates to a pulse shaper of a video U.S. Pat. No. 5,025,496, entitled, ODD/EVEN FIELD DETECTOR FOR VIDEO SIGNALS, in the names of Canfield, describes a field detector of a picture-in-picture (PIP) display processor of a video display. The field detector is used for distinguishing between odd and even picture fields in the video signal. The need for distinguishing between the odd and even fields arises because of the need to assure proper interlace and to avoid jitter of the small picture of the PIP arrangement.

In the Canfield patent, the field detector is responsive to a composite blanking or sync signal that includes both horizontal and vertical sync signals on the same signal line. In the detector, the time difference between the trailing edge of the vertical sync signal portion of the composite sync signal of a given field and the leading edge of the immediately following horizontal sync signal portion is measured. The measured time difference in one field is compared with the measured time difference in the next field. From the comparison, the type of field, even or odd, is determined. Advantageously, measuring the relatively short time interval from the trailing edge of the vertical sync signal portion to the leading edge of the following horizontal sync signal portion enables using a time difference counter having few stages.

The Canfield patent arrangement may be included in an integrated circuit (IC). The composite sync signal is generated outside the IC by combining at a single terminal or pin of the IC separate horizontal and vertical sync signals using a diode-OR arrangement. Advantageously, by employing the single terminal for providing the composite sync signal to the IC, the pin count of the IC is kept smaller than if the horizontal and vertical sync signals were provided via separate terminals or pins.

Typically, a vertical countdown circuit that is included in a deflection IC may be used for generating a control signal at the vertical rate. The control signal may be coupled in the deflection IC to a vertical sawtooth generator. The sawtooth signal may be developed at an output terminal of the deflection IC. The sawtooth signal is applied to a vertical deflection amplifier for generating a vertical deflection current. In order to reduce the pin count of the deflection IC, the control signal may not be provided at a dedicated pin or terminal of the deflection IC.

It may be desirable to generate the composite sync signal for the PIP display processor such that the vertical sync signal portion of the composite sync signal is synchronized to the control signal of the vertical countdown circuit.

An example of a boost supply circuit of a vertical amplifier is described in U.S. Pat. No. 5,229,692, in the name of Wilber, entitled VERTICAL DEFLECTION ARRANGEMENT WITH S-CORRECTION. Using the boost supply circuit for generating a vertical blanking signal is well known. Disadvantageously, the trailing edge of the pulse voltage that can be generated by the boost supply circuit may be subject to jitter or field-to-field variations. This is so because the pulse of the boost supply circuit may be affected by a horizontal rate signal that may be parasitically coupled to the vertical amplifier.

In contrast, the leading edge of the pulse voltage of the boost supply circuit occurs in the vicinity of vertical retrace and generally does not suffer from excessive variations or jitter. It may be desirable to derive from a boost supply circuit associated with the deflection amplifier the vertical sync signal portion of the composite sync signal that can be combined with a horizontal sync signal to produce a composite sync signal. Such a composite sync signal can be used in, for example, the aforementioned Canfield arrangement.

In accordance with an inventive feature, the pulse voltage of the boost supply circuit is reshaped such that the timing of the trailing edge is determined mainly by the timing of the leading edge and, thereby, becomes substantially less subject to variation introduced in the vertical deflection amplifier.

A signal generator of a video display apparatus, embodying an aspect of the invention, includes a vertical deflection amplifier for generating a deflection current in a deflection winding. A first pulse voltage is generated during a vertical retrace interval. A pulse shaper circuit is responsive to the first pulse voltage for producing a second pulse voltage having a trailing edge determined in accordance with the first pulse voltage and which occurs prior to a trailing edge of the first pulse voltage. The second pulse voltage is coupled to a utilization circuit for providing timing information from the trailing edge of the second pulse voltage.

Figure 1B:
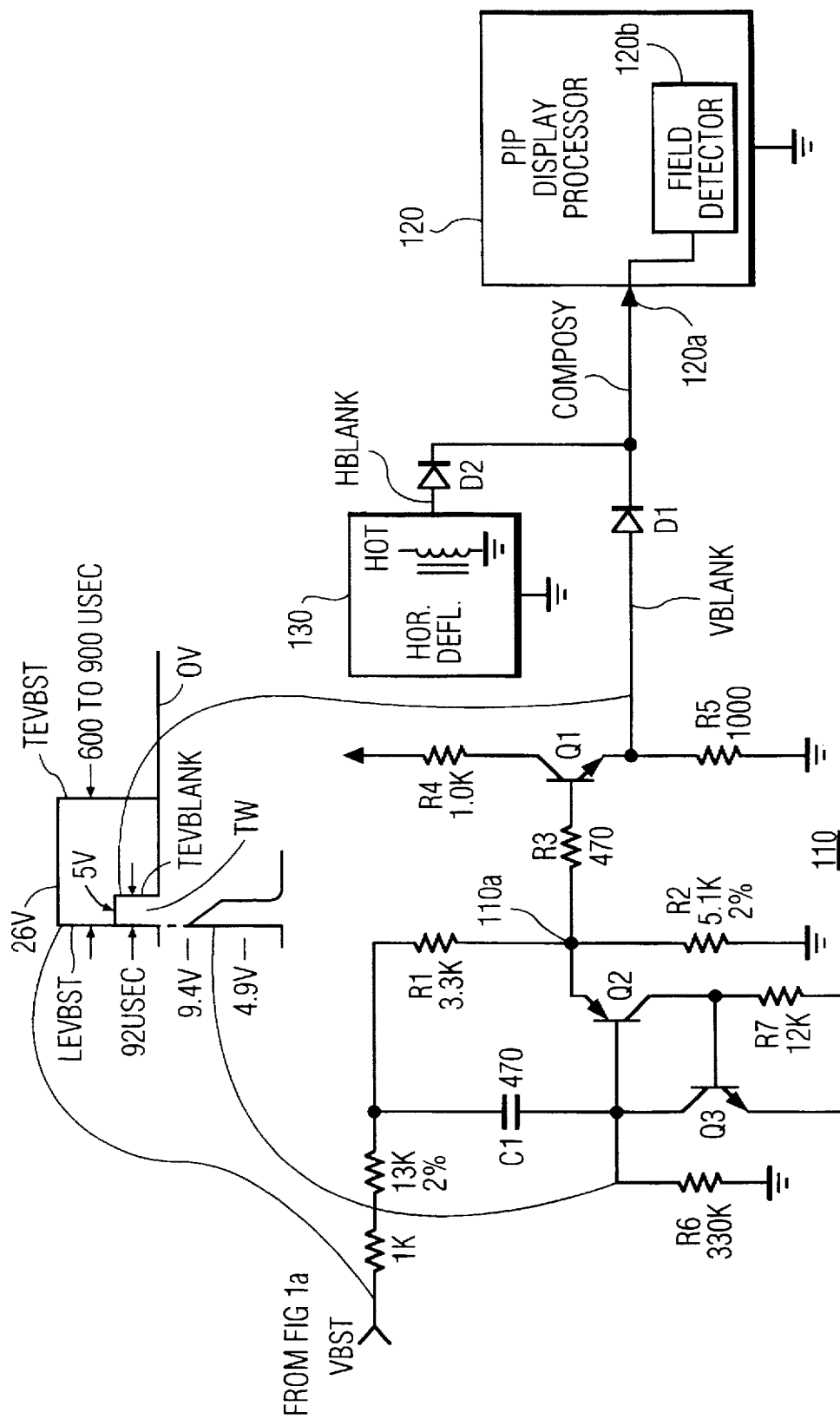

FIG. 1, that includes FIGURES 1a and 1b, illustrates a pulse shaper, embodying an inventive feature.

A conventional vertical deflection circuit 11 of FIG. 1a may be similar to that described in the Wilber Patent. A synchronizing signal SYNC is coupled to a conventional vertical timing generator 10 that may include a conventional vertical countdown circuit, not shown. Signal SYNC is produced by a video detector, not shown, of a television receiver that processes a baseband television signal, conforming, for example, to the NTSC standard. Generator 10 generates a pulse control signal VRESET at the vertical rate that is coupled to a conventional vertical sawtooth generator 100. Generator 100 generates a pair of sawtooth signals VRAMP2 and VRAMP1. Signals VRAMP1 and VRAMP2 are complementary signals that change in opposite directions during each vertical trace interval.

Circuit 11 is a D.C. coupled deflection cirucit controlled by signals VRAMP1 and VRAMP2. In circuit 11, a deflection winding Ly provides vertical deflection in a cathode ray tube (CRT) 22. Winding Ly is coupled in series with a deflection current sampling resistor R80. Winding Ly and resistor R80 form a series arrangement that is coupled between an output terminal 11b of an amplifier 11a and a junction terminal 11c of a power supply decoupling capacitor Cb. Amplifier 11a and a boost stage 11f are included in an integrated circuit (IC) TDA 8172. A D.C. voltage, applied to terminal 11c, is equal to about one-half of a supply voltage V+, referred to later on. A junction terminal 11d, coupled between winding Ly and resistor R80, is coupled via a feedback resistor R60 to an inverting input terminal of amplifier 11a. Terminal 11c of resistor R80 is coupled via a resistor R30 to a noninverting input terminal of amplifier 11a. In this way, a negative feedback voltage that is developed across resistor R80 is applied to the input terminals of amplifier 11a. Complementary sawtooth signals VRAMP1 and VRAMP2 are coupled via resistors R40 and R50, respectively, to the noninverting and inverting input terminals, respectively, of amplifier 11a for controlling deflection current iy, shown in FIG. 1a.

Because of the fast change in a retrace portion RETRACE in each of signals VRAMP1 and VRAMP2, deflection amplifier 11a ceases operating in a linear feedback mode and a voltage VB at the supply terminal pin 6 is applied to deflection winding Ly. A retrace voltage $V_{11}b$ is produced. A switch 11f1 of boost stage 11f causes a capacitor 11g to be coupled in series with a boost capacitor 11e. Capacitor 11e is charged via a diode X and a switch 11f2 from the +26V supply voltage V+, during vertical trace.

A supply voltage, developed across filter capacitor 11g, is summed up with a voltage developed across boost capacitor 11e so as to form boost voltage VB, during vertical retrace. Voltage VB is decoupled from the +26V supply voltage V+ via diode X, when boost voltage VB is formed. Boost voltage VB, approximately equal to twice the value of voltage V+, is applied to the transistor output stage, not shown, of amplifier 11a.

A vertical rate, pulse voltage VBST having a leading edge LEVBST is developed at pin 3 of IC TDA 8172 and at a terminal of capacitor 11e that is remote from diode X. Leading edge LEVBST coincides with the beginning of vertical retrace. A trailing edge TEVBST of pulse voltage VBST occurs in a vicinity of a time when amplifier 11a resumes linear mode operation.

Trailing edge TEVBST may be subject to field-to-field variations because of, for example, parasitic coupling of a horizontal rate signal produced in a horizontal output stage 130 of FIG. 1b. Field-to-field variations of trailing edge TEVBST may be more significant than of leading edge LEVBST.

A pulse shaper circuit 110, embodying an inventive feature, includes a voltage divider formed by a resistor R1 and a resistor R2, coupled in series. Pulse voltage VBST is coupled via a junction terminal 110a, between resistors R1 and R2, and a resistor R3 to a base of an emitter follower transistor Q1. Transistor Q1 has an emitter resistor R5 and a collector resistor R4. Consequently, a leading edge of an emitter pulse voltage VBLANK that is developed at the emitter of transistor Q1 substantially coincides with leading edge LEVBST.

Pulse voltage VBST is also coupled via a capacitor C1 to a base electrode of a shunt or clamp transistor Q2. Transistor Q2 has an emitter coupled to junction terminal 110a and a collector coupled to a collector load resistor R7. A resistor R6 is coupled to the base of transistor Q2. Resistor R6 and capacitor C1 form a differentiator, R-C network. A transistor Q3 has a collector electrode coupled to the base electrode of transistor Q2 and a base electrode coupled to the collector of transistor Q2. Transistors Q2 and Q3 form a regenerative switch when transistor Q2 is turned on.

During an interval TW, that immediately follows leading edge LEVBST, the base voltage of transistor Q2 is more positive than its emitter voltage. Therefore, transistor Q2 is turned off and has no effect on pulse voltage VBLANK. Therefore, during interval TW, voltage VBLANK is determined by the magnitude of voltage VBST and by the voltage divider that is formed by resistors R1 and R2. During interval TW, capacitor C1 is charged via resistor R6 and the base voltage of transistor Q2 decreases gradually, in accordance with the time constant of resistor R6 and capacitor C1.

At the end of interval TW, when capacitor C1 is charged to a sufficient level for developing a sufficiently low base voltage of transistor Q2, transistor Q2 is turned on. Consequently, transistor Q3 is turned on and the base voltage of transistor Q2 decreases and becomes close to 0V. Therefore, the emitter voltage of transistor Q2 at terminal 110a becomes sufficiently small to produce a transistor saturation voltage at the emitter of transistor Q1.

Advantageously, pulse voltage VBLANK has a trailing edge TEVBLANK, following interval TW, having a length that is independent on the timing of trailing edge TEVBST. Thus, advantageously, any field-to-field variation of trailing edge TEVBST that may be caused by parasitic coupling from a horizontal deflection circuit 130 will not affect trailing edge TEVBLANK.

Generators 10 and 100 may be included in an integrated circuit (IC) 100a that generates signals VRAMP1 and VRAMP2. Signals VRAMP1 and VRAMP2 are derived from signal VRESET. Thus, the need to use signal VRESET directly for generating signal VBLANK is avoided. Therefore, no dedicated pin that brings out signal VRESET from IC 100a is required. Thus, advantageously, the number of pins required for IC 100a is smaller than if signal VRESET had to be brought out separately from IC 100a.

A diode D1 couples pulse voltage VBLANK to an input terminal 120a of a PIP display processor 120. A pulse voltage HBLANK, at the horizontal rate, produced in horizontal deflection circuit 130, in a conventional manner, not shown, is coupled via a diode D2 to input terminal 120a of PIP display processor 120.

Thus, diodes D1 and D2 form a diode-OR configuration to produce a composite sync signal COMPOSY. Composite sync signal COMPOSY is coupled in processor 120 to a field detector 120b that may be similar to that described in, for example, the Canfield patent.

What is claimed is:

1. A pulse shaper of a video display apparatus, comprising:
   a shunt transistor switch;
   a source of a first pulse voltage at a frequency related to a vertical deflection frequency;
   a differentiator responsive to said first pulse voltage for generating a second pulse voltage coupled to a control terminal of said shunt transistor switch to control said shunt transistor switch in accordance with said second pulse voltage such that a trailing edge of said second pulse voltage occurs prior to a trailing edge of said first pulse voltage; and
   a first impedance coupled to said source of said first pulse voltage and to a main current conductive terminal of said shunt transistor switch for generating a third pulse voltage having a trailing edge that is determined in accordance with said trailing edge of said second pulse voltage, said third pulse voltage being coupled to a video display processor for providing timing information of said first pulse voltage from said trailing edge of said third pulse voltage.

2. A pulse shaper according to claim 1 wherein a leading edge of said third pulse voltage is determined in accordance with a leading edge of said first pulse voltage.

3. A pulse shaper according to claim 1 wherein said differentiator comprises an R-C network.

4. A pulse shaper according to claim 1 wherein each of a first signal path between said source of said first pulse voltage and said control terminal of said transistor switch and a second signal path between said source of said first pulse voltage and said main current conductive terminal of said transistor switch includes exclusively passive elements.

5. A pulse shaper according to claim 1 further comprising a second transistor switch coupled to said first transistor switch to form therewith a regenerative switch.

6. A pulse shaper according to claim 1 further comprising: a second impedance coupled to said first impedance to form a voltage divider for developing a portion of said first pulse voltage at said main current conductive terminal having a peak amplitude that is different from a peak amplitude of said second pulse voltage; and, said shunt transistor switch being disabled as long as a difference between said first pulse voltage portion and said second pulse voltage is within a range of values and is enabled when said difference is outside said range of values.

7. A pulse shaper according to claim 1 wherein said video display processor comprises a picture-in-picture display processor.

8. A pulse shaper according to claim 1 further comprising a source of a fourth pulse voltage at a frequency related to a horizontal deflection frequency, said third and fourth pulse voltages being combined to form a composite blanking signal.

9. A pulse shaper according to claim 1, wherein said source of said first pulse voltage comprises a power supply boost stage of a vertical deflection amplifier, said first pulse voltage being generated in said boost stage during a vertical retrace interval.

10. A signal generator of a video display apparatus, comprising:

a vertical deflection output stage for generating a deflection current in a deflection winding and for generating a first pulse voltage during a vertical retrace interval; and a pulse shaper circuit responsive to said first pulse voltage for producing a second pulse voltage having a trailing edge determined in accordance with said first pulse voltage and which occurs prior to a trailing edge of said first pulse voltage, said second pulse voltage being coupled to a utilization circuit for providing timing information from said trailing edge of said second pulse voltage.

11. A signal generator according to claim 10 wherein said output stage comprises a power supply boost stage coupled to a deflection amplifier and wherein said first pulse voltage is generated in said boost stage.

12. A signal generator according to claim 10 wherein said utilization circuit comprises a picture-in-picture display processor.

13. A signal generator according to claim 10 further comprising, a source of a third pulse voltage at a frequency related to a horizontal deflection frequency, said third pulse voltage and said second pulse voltage being combined to form a composite blanking signal.

14. A pulse shaper of a video display apparatus, comprising:

a power supply boost stage of a vertical deflection amplifier for producing a first pulse voltage during a vertical retrace interval; and first and second transistors coupled to form a regenerative switch, said regenerative switch being responsive to said first pulse voltage for generating a second pulse voltage having a pulse width narrower than that of said first pulse voltage, said second pulse voltage being coupled to a utilization circuit for providing timing information thereto.

15. A pulse shaper according to claim 14 further comprising: a voltage divider responsive to said first pulse voltage and coupled to a main current conductive terminal of said first transistor for developing a portion of said first pulse voltage at said main current conductive terminal; and, a differentiator responsive to said first pulse voltage for generating a third pulse voltage at a control terminal of said first transistor.

16. A pulse shaper according to claim 15, wherein during a first interval, when a difference between said first pulse voltage portion and said third pulse voltage is within a range of values, said regenerative switch is disabled and, during a second interval, when said difference is outside said range, said regenerative switch shunts said first pulse voltage portion for decreasing a pulse width of said first pulse voltage portion, in accordance with said third pulse voltage.

* * * * *